US008432650B2

(12) United States Patent
Seger (10) Patent No.: US 8,432,650 B2
(45) Date of Patent: Apr. 30, 2013

(54) RELAY SWITCHING METHOD AND HYBRID RELAY SWITCH (75) Inventor: Ronald N. Seger, Prior Lake, MN (US)

(73) Assignee: Phillips & Temro Industries Inc., Eden Prairie, MN (US)

(*) Notice: Subject to any disclaimer, the term of this patent is extended or adjusted under 35 U.S.C. 154(b) by 265 days.

(21) Appl. No.: 12/739,119

(22) PCT Filed: Nov. 5, 2008

(86) PCT No.: PCT/US2008/082459
§ 371 (c)(1),
(2), (4) Date: Apr. 21, 2010

(87) PCT Pub. No.: WO2009/061802
PCT Pub. Date: May 14, 2009

(65) Prior Publication Data
US 2010/0232082 A1  Sep. 16, 2010

Related U.S. Application Data (60) Provisional application No. 61/001,877, filed on Nov. 5, 2007.

(51) Int. Cl.
H01H 47/26 (2006.01)
(52) U.S. Cl.
USPC ............................................ 361/54; 361/211

(58) Field of Classification Search .................. None
See application file for complete search history.

(56) References Cited

U.S. PATENT DOCUMENTS

| 5,666,254 | A | * | 9/1997 | Thomas et al. | 361/8 |
| 6,067,219 | A | * | 5/2000 | Armstrong et al. | 361/101 |
| 6,606,228 | B1 | * | 8/2003 | Potter, IV | 361/104 |
| 6,870,720 | B2 | * | 3/2005 | Iwata et al. | 361/58 |
| 7,259,945 | B2 | * | 8/2007 | Cleveland | 361/2 |
| 2006/0150959 | A1 | * | 7/2006 | Prust et al. | 123/549 |
| 2007/0139985 | A1 | * | 6/2007 | Bax et al. | 363/106 |
| 2007/0194009 | A1 | * | 8/2007 | Seger | 219/600 |

* cited by examiner

Primary Examiner — Stephen W Jackson
Assistant Examiner — Angela Brooks
(74) Attorney, Agent, or Firm — Harness, Dickey & Pierce, P.L.C.

(57) ABSTRACT

A control system comprises a solid-state switch, a mechanical current interrupting device, and a control module. The solid-state switch is connected in series with a power source and an intake air heater. The mechanical current interrupting device is connected in series with the power source and the solid-state switch. The control module selectively closes the solid-state switch to provide power to the intake air heater. The control module also causes the mechanical current interrupting device to mechanically interrupt current flow to the intake air heater when a voltage of the intake air heater is outside of a desired range.

22 Claims, 12 Drawing Sheets

RELAY SWITCHING METHOD AND HYBRID RELAY SWITCH

FIELD

The present disclosure relates to methods and apparatus that switch electrical current.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Compression combustion engines combust a mixture of air and fuel to produce torque. When starting an compression combustion engine in cold weather, heating of the air may help the compression combustion engine to reach a desired operating temperature more quickly. As air is drawn into the compression combustion engine, it may be warmed by a heater. For example only, this heater may be a resistive heater, which generates heat in response to electric current.

The heater may be powered by a battery. In various implementations, the battery may also be used to provide power to glow plugs and/or a starter motor. The heater may be controlled by placing a solid-state switch between the battery and the heater. By closing the solid-state switch, current is allowed to flow from the battery through the heater, thereby generating heat. Opening the solid-state switch stops the flow of heat.

SUMMARY

A control system comprises a solid-state switch, a mechanical current interrupting device, and a control module. The solid-state switch is connected in series with a power source and an intake air heater. The mechanical current interrupting device is connected in series with the power source and the solid-state switch. The control module selectively closes the solid-state switch to provide power to the intake air heater. The control module also causes the mechanical current interrupting device to mechanically interrupt current flow to the intake air heater when a voltage of the intake air heater is outside of a desired range.

A control system comprises a solid-state switch, a current shunt circuit, and a control module. The solid-state switch is connected in series with a power source, a mechanical current interrupting device, and a load. The current shunt circuit is connected in parallel with the load and selectively acts as a short circuit. The control module selectively closes the solid-state switch to provide power to the load. The control module also short circuits the current shunt circuit when a voltage of the load is outside of a desired range.

A control system comprises a solid-state switch and a control module. The solid-state switch is connected in series with a power source, an electrically-controlled mechanical current interrupting device, and a load. The control module selectively closes the solid-state switch to provide power to the load. The control module also outputs an electrical signal when a voltage of the load is outside of a desired range. The electrical signal causes the electrically-controlled mechanical current interrupting device to mechanically interrupt current flow to the load.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Semiconductor switches, such as transistors, may be used to switch power to loads. For example only, solid-state switches may have faster switching speeds than other switching components, such as mechanical relays. A solid-state switch can be rapidly cycled on and off to control power to a load using a modulation scheme such as pulse-width modulation (PWM).

A solid-state switch may gradually deteriorate when operating at high current levels. In addition, high current levels may produce large amounts of heat in the solid-state switch, and the amount of heat may increase as the solid-state switch deteriorates. When a solid-state switch fails, which may be as a result of overheating, the solid-state switch may fail in a closed state. If a solid-state switch is providing current to a heater, the failed switch can no longer halt current going to the heater. The source of power, such as a vehicle battery, may therefore be drained. In addition, the temperature of the heater may increase to a point where damage is caused to the heater and/or to surrounding components.

In order to mitigate a solid-state switch failure, a current interrupting device may be placed in series with the solid-state switch. In this way, if the solid-state switch fails in a closed position, the current interrupting device can be actuated to interrupt current.

For example only, a relay or a fuse may be used as a current interrupting device. The relay may remain closed until a fault is detected with the solid-state switch. In various implementations, the relay may be opened at times when the heater is not in use. This provides an additional measure of safety against the undesired flow of current.

When using a fuse, an additional device may be added to ensure that the fuse breaks the circuit at the correct time. When the solid-state switch fails, the current flowing through the solid-state switch may be within a normal range. However, because control of the current is no longer available, the normal level of current may exist for too long, leading to overheating. A current shunting device may therefore be used to force the fuse to interrupt the circuit when the solid-state switch fails.

For example, if a controller identifies a fault, such as the failure of the solid-state switch, the controller may activate the current shunting device. The current shunting device couples the fuse to ground, thereby increasing current to a point that blows the fuse. For example only, this current shunt circuit may be another solid-state switch or a relay. A fault may also be identified if a temperature, such as a temperature of the heater, increases above a threshold.

In various implementations, the current generated by directly shorting the fuse to ground may put excessive load on the battery and may exceed current carrying capacities of other system components, such as wires and printed circuit board traces. Therefore, a current limiting circuit can be inserted in series with the current shunt circuit. For example only, the current limiting circuit may include a resistor. The current limiting circuit may be designed to allow enough current to flow to blow the fuse in a reasonable amount of time without exceeding system current limits. In various implementations, other mechanical current interrupting devices, such as a circuit breaker, may be used in place of the fuse.

Figure 1A:
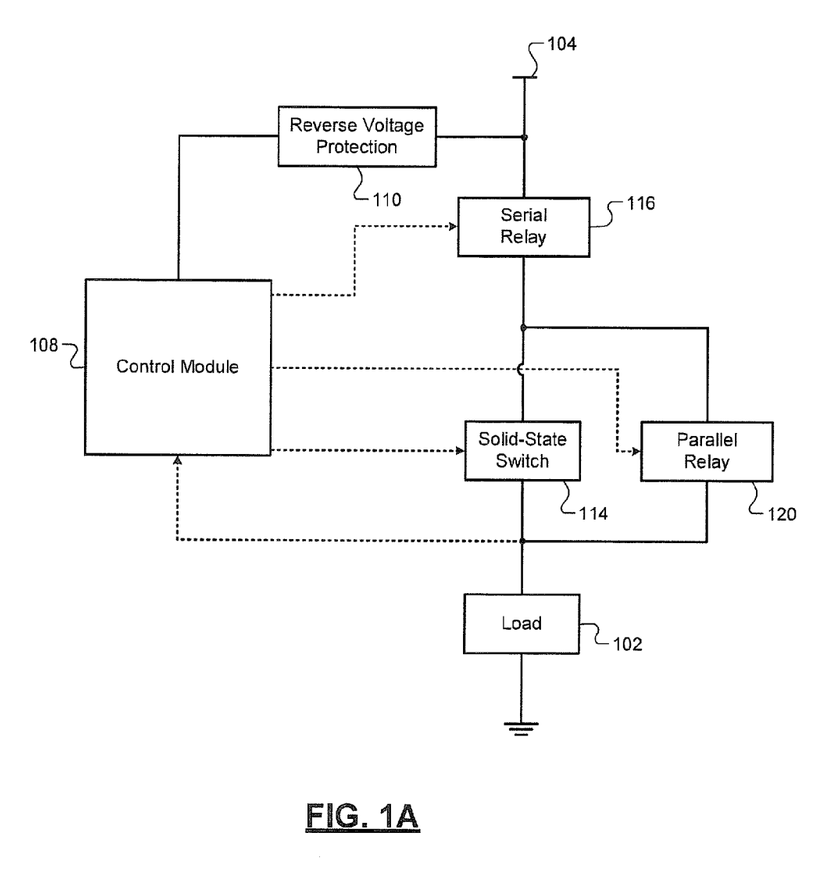
FIGS. 1A-1B are functional block diagrams of exemplary load systems according to the principles of the present disclosure.

Referring now to FIG. 1A, a functional block diagram of an exemplary load system is presented. A load 102 receives power from a power source 104, such as a battery. For example, the load 102 may be a heater, such as an intake air heater of an compression combustion engine. A control module 108 may also receive power from the power source 104. The control module 108 may be protected by a reverse voltage protection module 110.

For example only, the reverse voltage protection module 110 may be located between the control module 108 and the power source 104. The reverse voltage protection module 110 may protect against the polarity of the power source 104 being inverted, such as when a vehicle battery is misconnected or when a jumpstart is provided incorrectly.

The control module 108 controls a solid-state switch 114 and a serial relay 116. The solid-state switch 114 and the serial relay 116 are connected in series with the power source 104 and the load 102. Power to the load 102 may be interrupted by creating an open circuit with either the solid-state switch 114 or the serial relay 116.

In various implementations, a parallel relay 120 may be connected in parallel with the solid-state switch 114. The parallel relay 120 may also be controlled by the control module 108. The parallel relay 120 may shunt current around the solid-state switch 114. In various implementations, the parallel relay 120 may produce less heat for a given current than will the solid-state switch 114.

By decreasing the current flowing through the solid-state switch 114, the heat generated by the solid-state switch 114 is decreased. The lifetime of the solid-state switch 114 may therefore increase. In addition, the size of the solid-state switch 114 and/or an associated heat sink may be decreased.

One possible disadvantage of relays is that arcing may occur when opening or closing a connection. When a large voltage potential exists across the relay, arcing may occur as contacts of the relay approach each other to make a connection and as they separate from each other to break the connection.

If the parallel relay 120 is closed after the solid-state switch 114 has already been closed, the voltage potential across the parallel relay 120 will be minimal. Therefore, arcing as the parallel relay 120 closes will be minimized. Further, if the parallel relay 120 is opened prior to opening the solid-state switch 114, arcing will also be minimized.

In various implementations, the parallel relay 120 may be unable to switch as quickly as the solid-state switch 114. Rapid switching may occur during PWM control. If the PWM switching frequency is reduced to accommodate switching of the parallel relay 120, the load 102 may not act as if driven by a reduced power. Instead, the load 102 may vary between a low power and a high power. For example, at a low switching frequency, the temperature of a heater may oscillate. When the solid-state switch 114 is being modulated, such as when performing PWM control, the parallel relay 120 may therefore remain open.

In order to minimize arcing, the serial relay 116 may be closed prior to the solid-state switch 114 being closed. If the solid-state switch 114 is open, there is no current path through the serial relay 116 (assuming that the parallel relay 120 is also open). Closing the serial relay 116 will therefore not generate arcing across the contacts of the serial relay 116. Similarly (except for when a fault is detected), the serial relay 116 may remain closed until the solid-state switch 114 opens.

The control module 108 may monitor the voltage at the node between the load 102 and solid-state switch 114. If the solid-state switch 114 is off, a voltage of approximately zero should be detected at this node. In addition, the control module 108 may verify that the voltage of the node is within an expected range, while the solid-state switch 114 is closed. If the voltage of the node is not within the expected range, the control module 108 may instruct the serial relay 116 to open. In various implementations, if power is removed from the serial relay 116, the serial relay 116 will automatically open, such as by spring force. In this way, even if the control module 108 fails, current will be interrupted to the load 102.

Figure 1B:
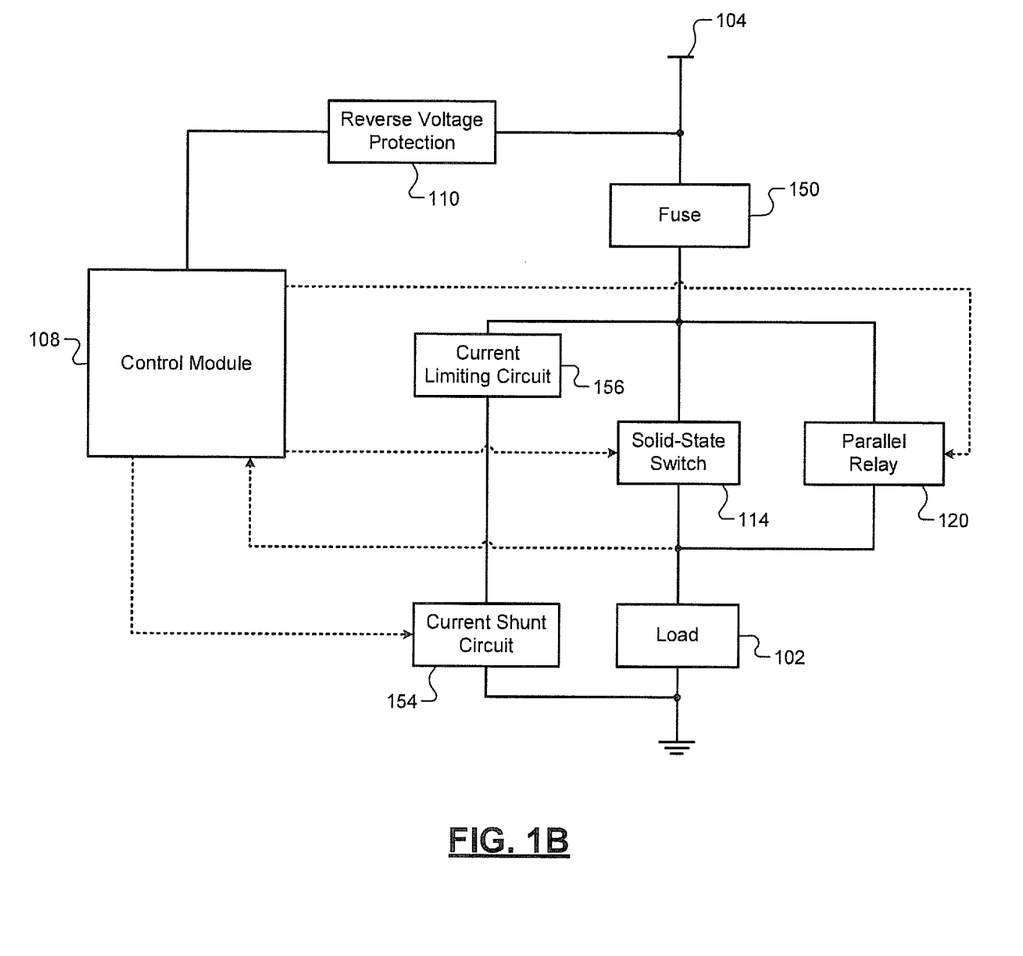

Referring now to FIG. 1B, a fuse 150 is placed in series with the power source 104 and the solid-state switch 114. When the control module 108 detects that the voltage between the solid-state switch 114 and the load 102 is in an unexpected range, the control module 108 may activate a current shunt circuit 154. The current shunt circuit 154 shorts the fuse 150 to ground. In various implementations, a current limiting circuit 156 may be located between the current shunt circuit 154 and the fuse 150 in order to limit the amount of current generated by the current shunt circuit 154.

The current limiting circuit 156 may include a resistance, such as may be formed by a resistive trace, a resistor, and/or a transistor. The current limiting circuit 156 limits the current to a level that will still blow the fuse 150. In various implementations, the fuse 150 may be substituted with another circuit element that will create an open circuit in the presence of excessive current, such as a circuit breaker.

Figure 2A:
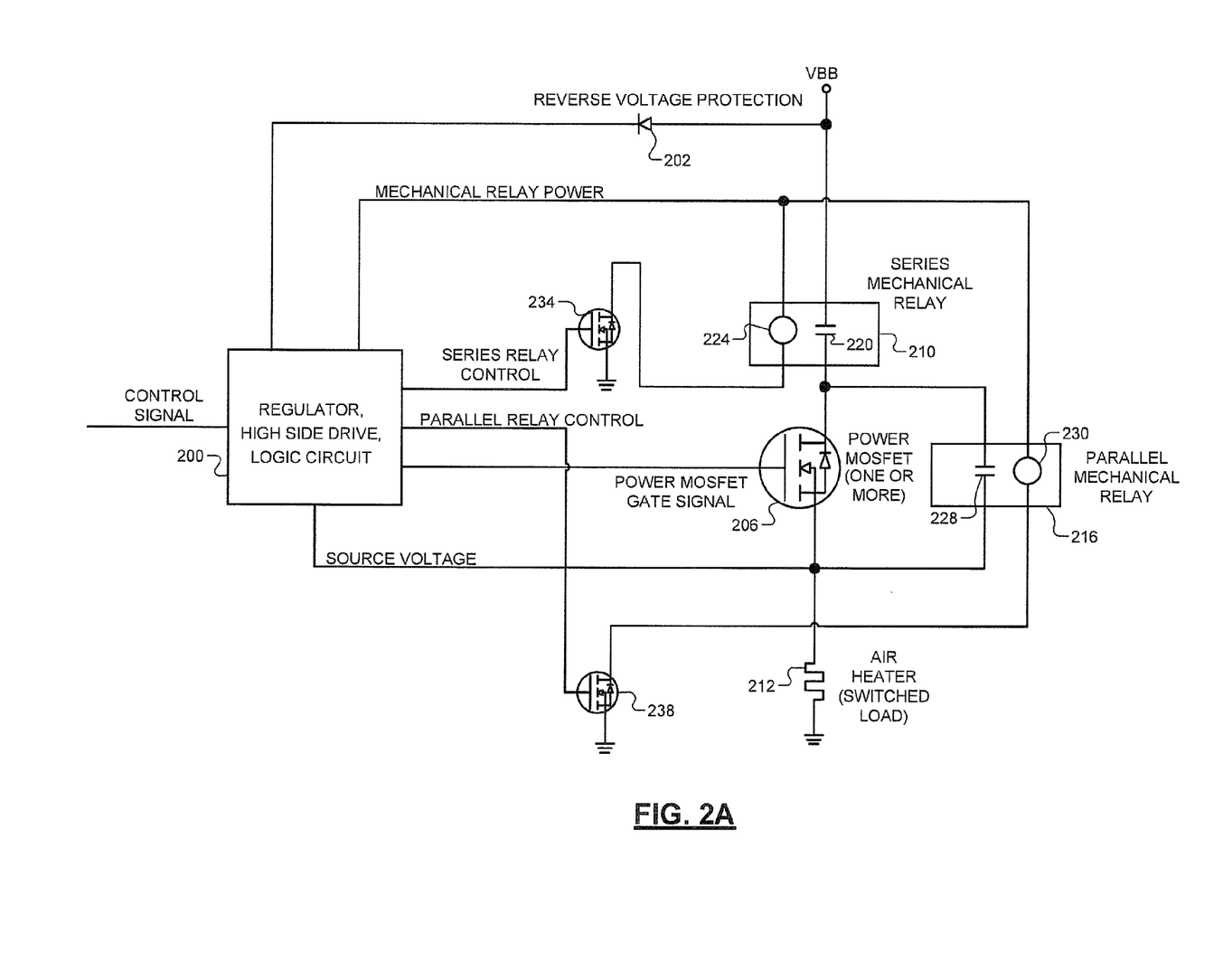
FIGS. 2A-2D are functional block diagrams of exemplary implementations of the systems of FIGS. 1A-1B according to the principles of the present disclosure.

Referring now to FIG. 2A, a functional block diagram of an exemplary implementation of the system of FIG. 1A is presented. A control module 200 receives battery power (VBB) via a diode 202. The control module 200 may include a voltage regulator, a high side driver, and logic circuitry. The control module 200 may receive a control signal indicating the extent of heating that is desired.

A power MOSFET (metal-oxide-semiconductor field-effect transistor) 206 and a mechanical relay 210 are placed in series between VBB and a load 212, such as an electrical air heater. In various implementations, the power MOSFET 206 of FIGS. 2A-2D may include more than one MOSFET. Multiple MOSFETs may be used to increase current handling ability.

A mechanical relay 216 is arranged in parallel with the power MOSFET 206. The mechanical relay 210 includes a pair of contacts 220 and an electromagnetic coil 224. The electromagnetic coil 224 is selectively energized to bring the contacts 220 together or to push them apart. A spring may apply a counteracting force to the electromagnetic coil 224. In various implementations, the contacts 220 of the mechanical relay 210 may be pushed apart from each other by default, and brought into contact by the electromagnetic coil 224.

The mechanical relay 216 also includes a pair of contacts 228 and an electromagnetic coil 230. In various implementations, the contacts 228 of mechanical relay 216 may be held apart by default by a spring. One terminal of the electromagnetic coils 224 and 230 may receive power from the control module 200. A second terminal of the electromagnetic coils 224 and 230 may be connected to ground via control transistors 234 and 238, respectively.

The control module 200 controls the power MOSFET 206 using a signal connected to a gate terminal of the power MOSFET 206. The control module 200 selectively provides a signal to a gate of the transistor 234 to connect the electromagnetic coil 224 to ground, thereby energizing the electromagnetic coil 224 and closing the contacts 220. The control module 200 also selectively applies a gate voltage to the transistor 238, which connects the electromagnetic coil 230 to ground.

The contacts 220 and 228 of the mechanical relays 210 and 216 may be made of more compliant and more conductive materials when arcing has been reduced or eliminated as described above. In addition, the contacts 220 and 228 may be incorporated into a circuit board that is thermally conductive. This thermally conductive material may distribute and dissipate heat generated at the contacts 220 and 228. This may allow the contacts 220 and 228 to be reduced in size.

Figure 2B:
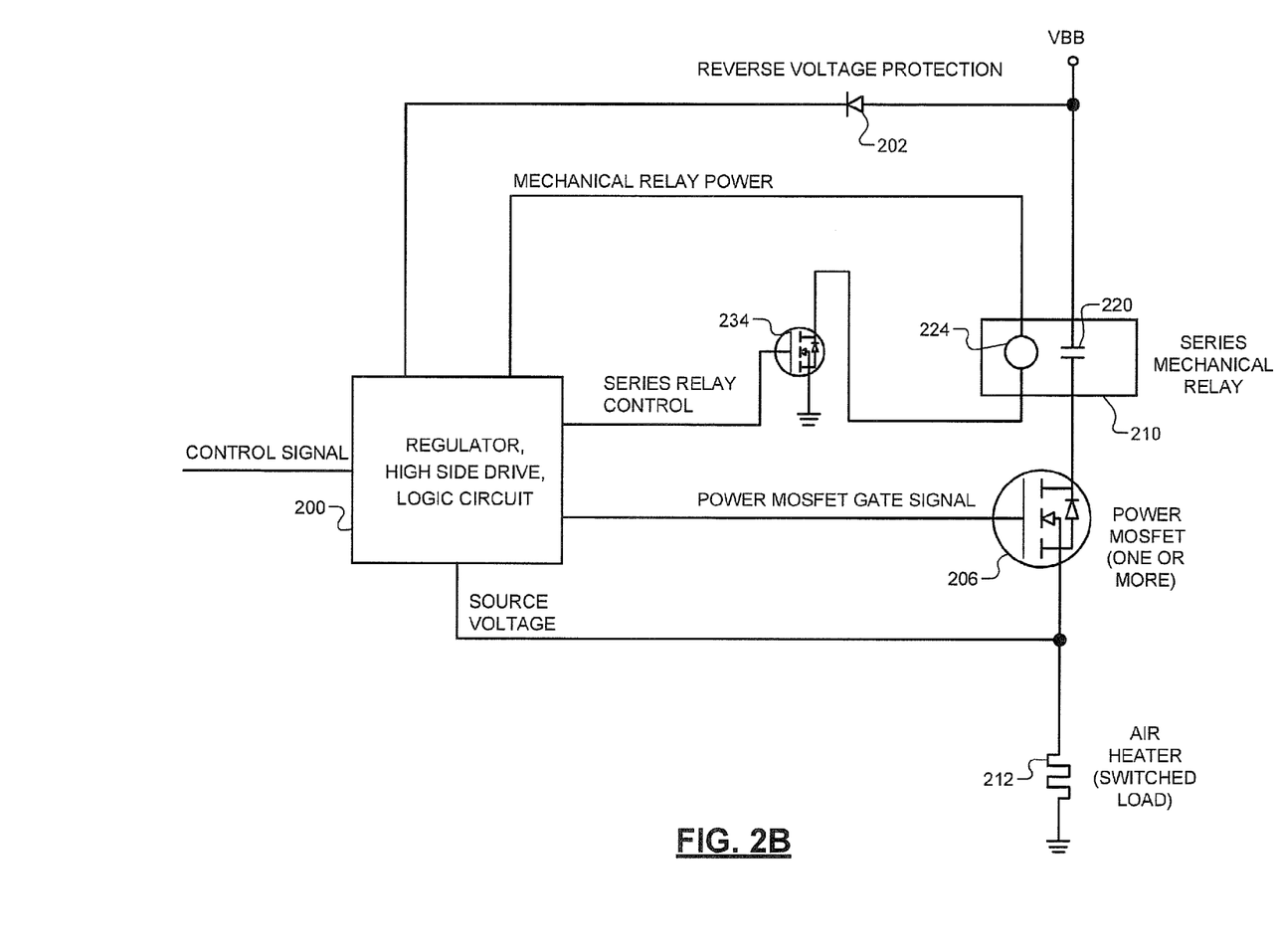
Figure 2C:
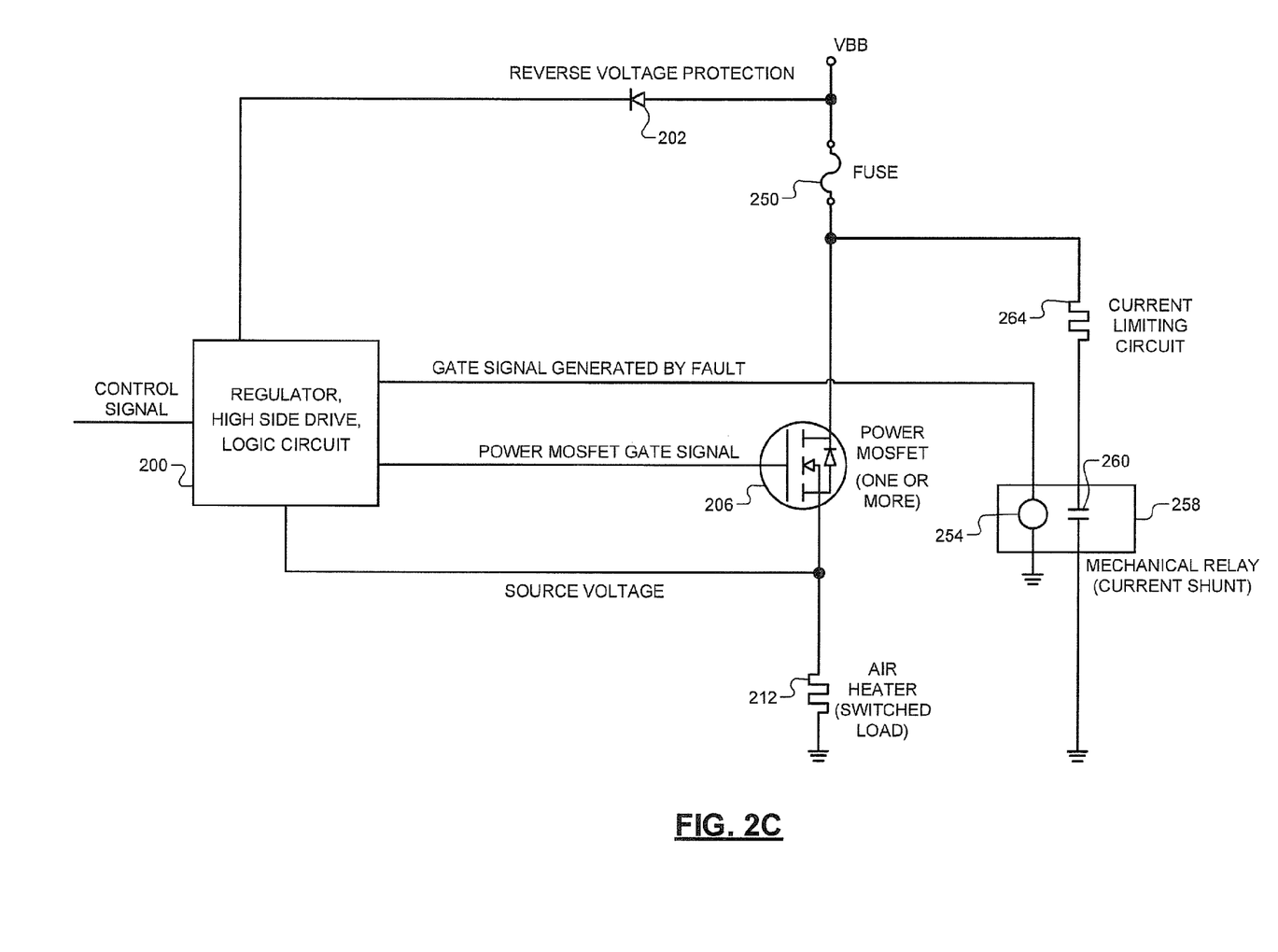

Referring now to FIG. 2B, a functional block diagram of a switching load system without the parallel mechanical relay 216 is shown. Referring now to FIG. 2C, a fuse 250 is located in series between the power MOSFET 206 and VBB.

When the control module 200 detects a voltage at the source of the power MOSFET 206 that it outside of an expected range, such as a non-zero voltage when the power MOSFET 206 has been deactivated, the control module 200 may declare a fault. Based on the fault, the control module 200 may energize an electromagnetic coil 254 of a mechanical relay 258.

Activating the electromagnetic coil 254 closes contacts 260 of the mechanical relay 258, thereby shorting the fuse 250 to ground. In various implementations, a current limiting circuit 264 may be located between the fuse 250 and the mechanical relay 258, thereby decreasing the current flowing through the fuse 250. For example only, the current limiting circuit 264 may be implemented as a resistor or a resistive trace. For example only, a resistive trace may be formed by etching or adding a resistive network into a circuit layer of a thermally conductive printed circuit board.

Figure 2D:
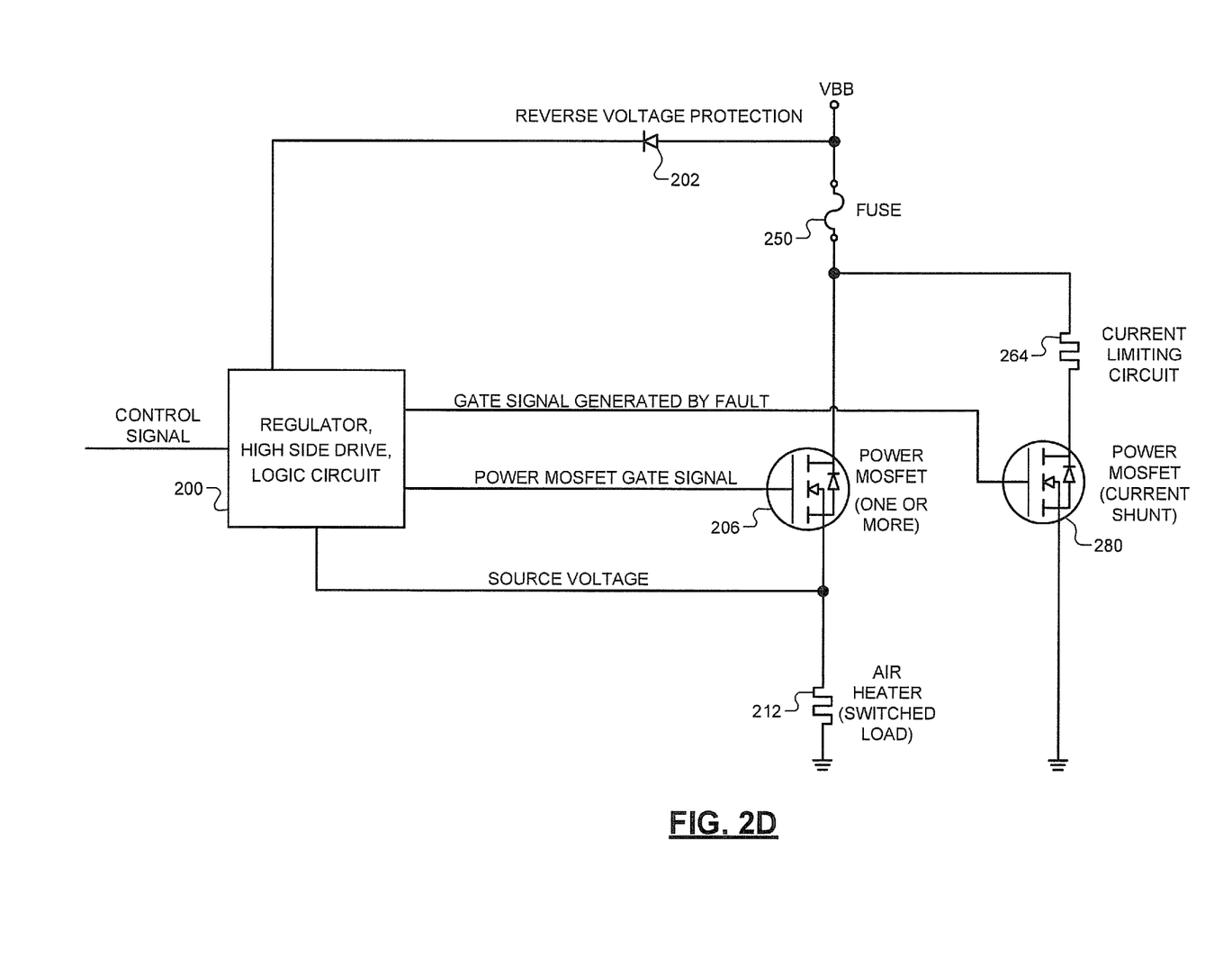

Referring now to FIG. 2D, the control module 200 may react to a fault by transmitting a gate signal to a power MOS-FET 280, which shorts the fuse 250 to ground. In various implementations, various components of FIGS. 2A-2D may be integrated onto a single printed circuit board and/or incorporated into a single enclosure. Various other components may be located externally to the printed circuit board or to the enclosure. These external components may include fuses, circuit breakers, shunt devices, relays, etc. These external components may receive control signals from the control module 200. The external components may also receive actuation signals, such as when a switchable current is output to the electromagnetic coil of a relay.

Figure 3A:
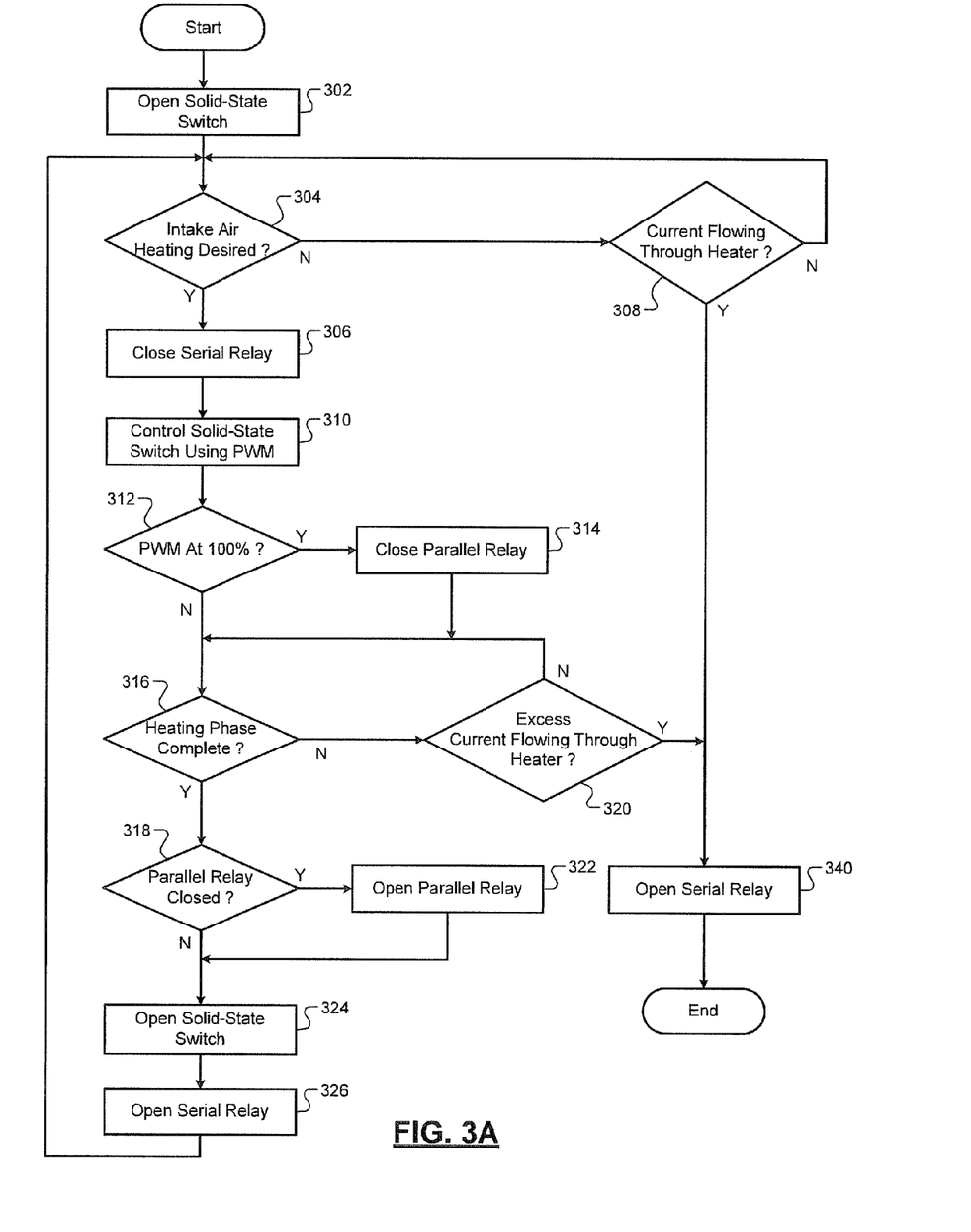
FIGS. 3A-3B are flowcharts depicting exemplary operation of the systems of FIGS. 1A-1B, respectively according to the principles of the present disclosure.

Referring now to FIG. 3A, a flowchart depicts exemplary operation of the system of FIG. 1A. Control begins in step 302, where the solid-state switch is opened. Control continues in step 304, where control determines whether intake air heating is desired. If so, control transfers to step 306; otherwise, control transfers to step 308.

In step 306, control closes the serial relay. Control then continues in step 310, where control operates the solid-state switch using PWM. Control continues in step 312, where if the PWM is operating at 100 percent duty cycle, control transfers to step 314; otherwise, control transfers to step 316. In step 314, the parallel relay is closed, and control continues in step 316.

In step 316, control determines whether the current heating phase is complete. If so, control transfers to step 318; otherwise, control transfers to step 320. The heater may be operated in phases. For example, a new phase may begin when switching the PWM duty cycle from 100 percent to a smaller level. When the duty cycle of PWM is less than 100 percent, the parallel relay will remain open.

In step 318, if the parallel relay is currently closed, control transfers to step 322; otherwise, control transfers to step 324. In step 322, the parallel relay is opened, and control continues in step 324. In step 324, the solid-state switch is opened, and control continues in step 326. In step 326, the serial relay is opened, and control returns to step 304.

In step 308, control determines whether current is flowing through the heater. If so, control transfers to step 340; otherwise, control returns to step 304. Control may determine whether current is flowing through the heater by monitoring a voltage at a terminal of the heater. In step 340, the serial relay is opened to cut off undesired current flowing through the heater. In step 320, control determines whether excess current is flowing through the heater. Because the solid-state switch is being driven by PWM, some current should be flowing through the heater. However, if the current is beyond what is expected, control transfers to step 340; otherwise, control returns to step 316. In various implementations, the level of current may be inferred based on a voltage of the heater.

Figure 3B:
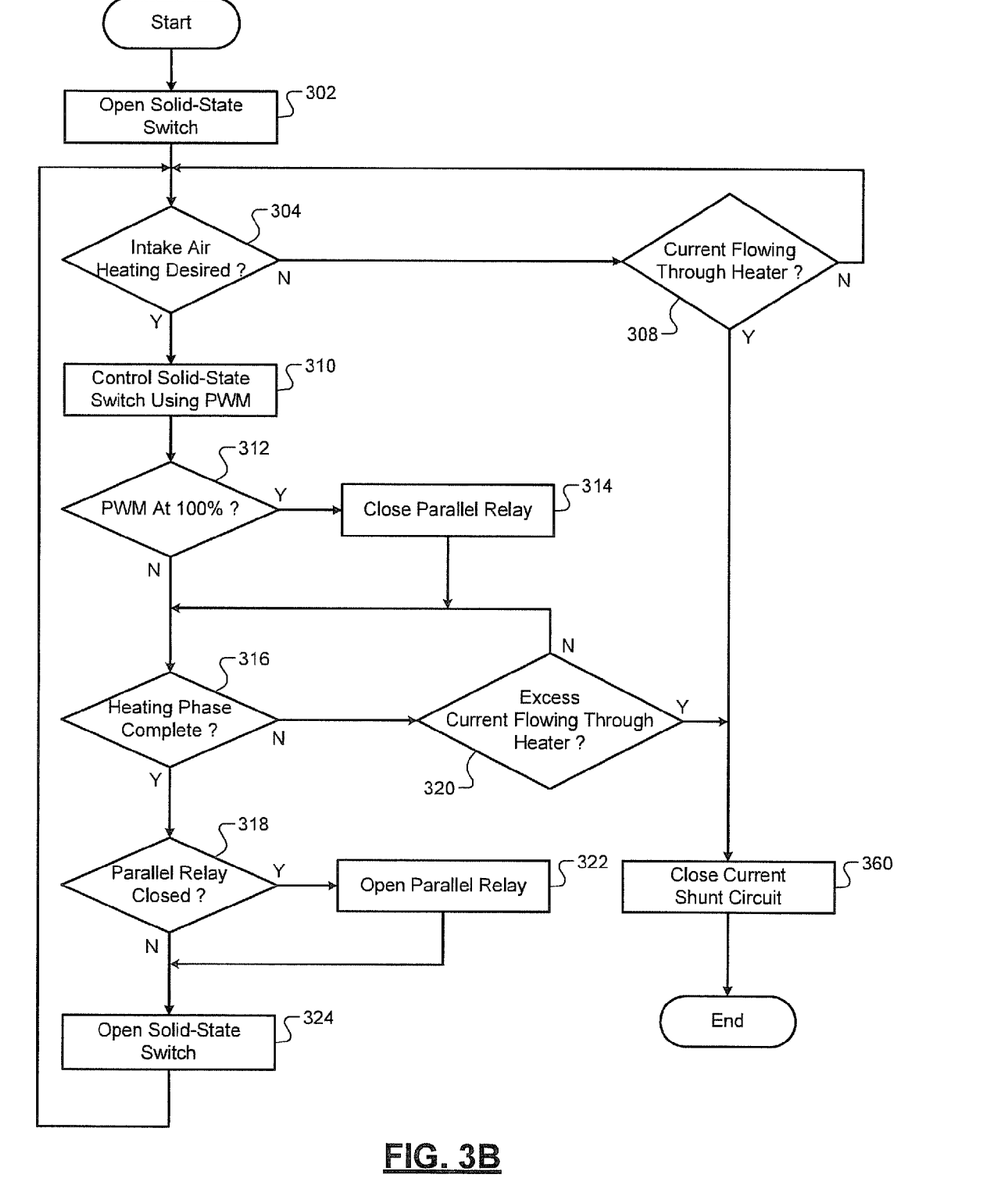

Referring now to FIG. 3B, a flowchart depicts exemplary operation of the system of FIG. 1B. When undesired current is detected in steps 308 or 320, control transfers to step 360. In step 360, control closes the current shunt circuit, thereby blowing the fuse.

Figure 4A:
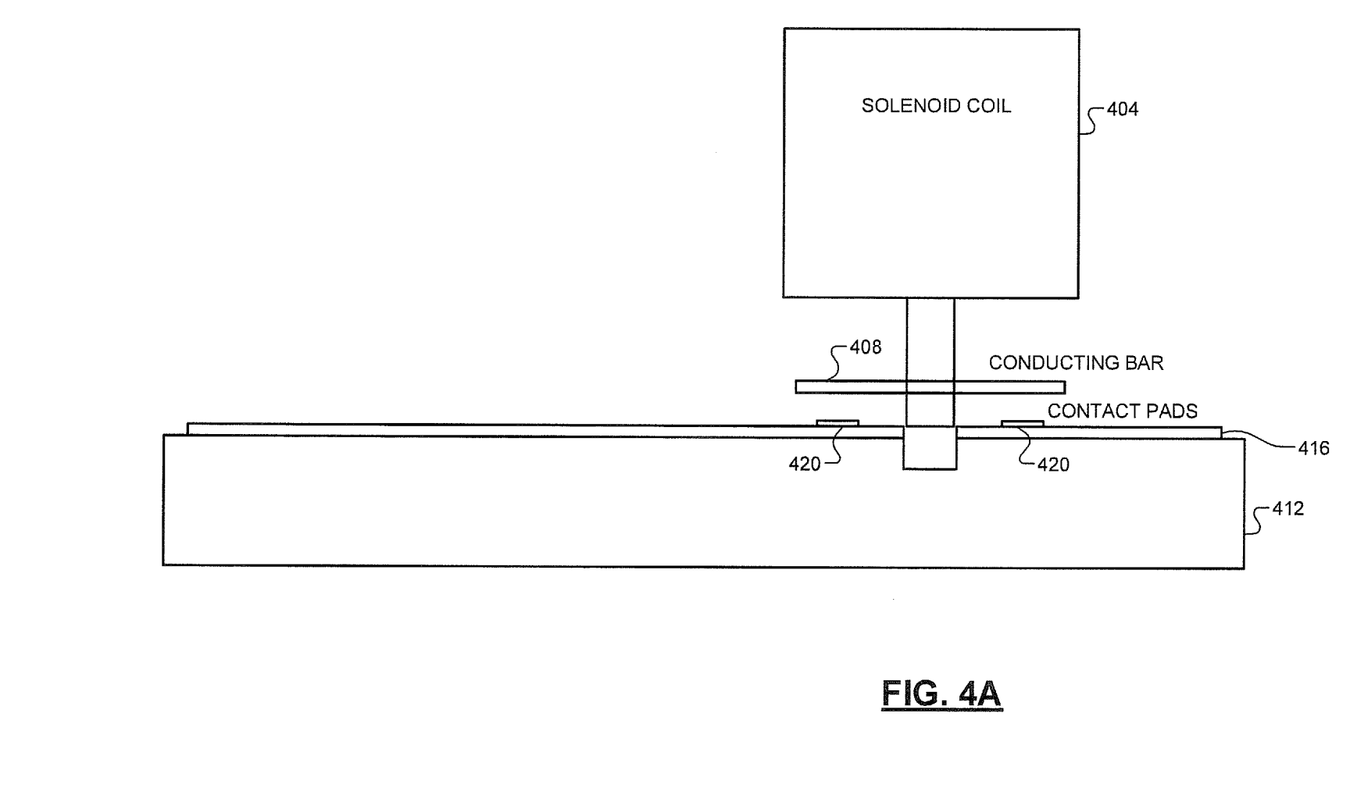
FIGS. 4A-4B are cross-sectional views of exemplary implementations of a mechanical relay according to the principles of the present disclosure.
Figure 4B:
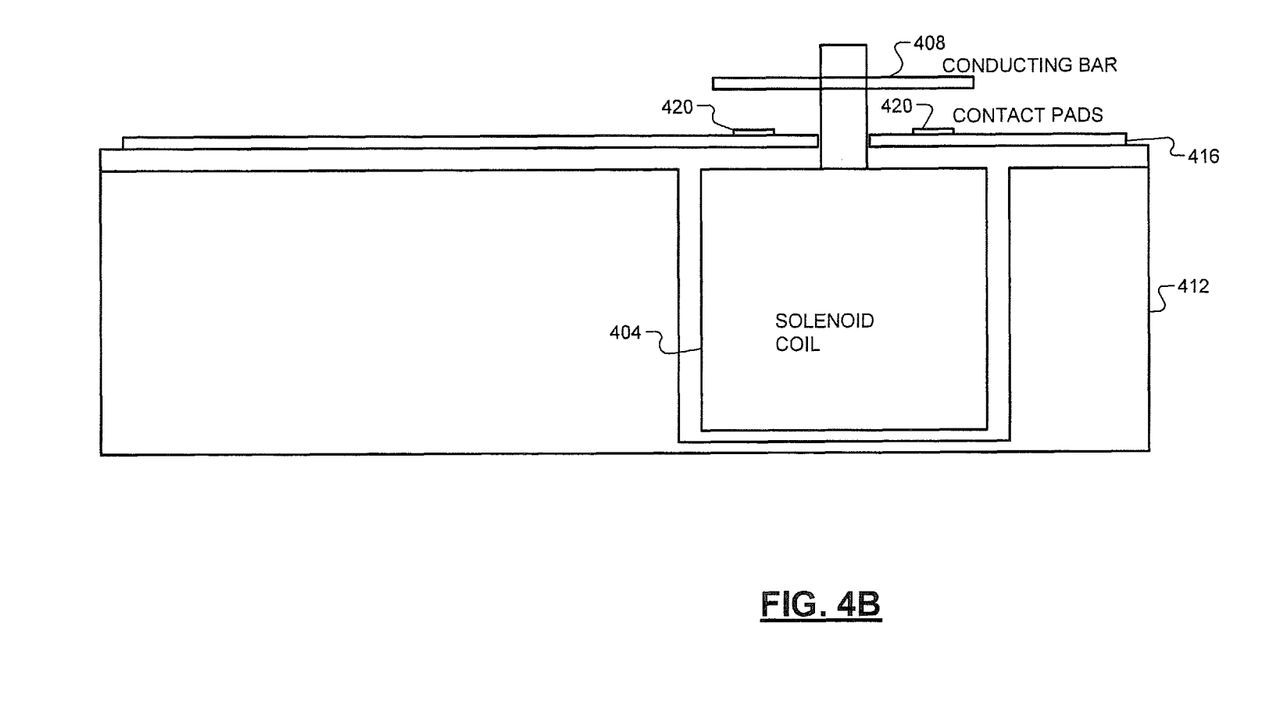

Referring now to FIGS. 4A-4B, cross-sectional views of exemplary implementations of a relay, such as the mechanical relays 210, 216, or 258, are depicted. A solenoid coil 404 actuates a conducting bar 408 along a direction perpendicular to a substrate 412. For example only, the substrate 412 may be a printed circuit board (PCB) substrate.

In various implementations, the substrate may include a material, such as aluminum, that has greater thermal conductivity than more common PCB materials, such as Flame Retardant 4 (FR-4). A circuit layer 416 may include an electrically conductive material, such as copper. The circuit layer 416 may be patterned to provide electrical connection between various components on the substrate 412.

A dielectric layer (not shown) may be included between the circuit layer 416 and the substrate 412 when the substrate 412 is electrically conductive. The dielectric layer may provide high thermal conductivity between the circuit layer 416 and the substrate 412. The substrate 412 therefore dissipates heat from components attached to the circuit layer 416. In addition, the substrate 412 may be mounted to a heat sink. For example only, the substrate 412 may be mounted within an enclosure made from a material, such as aluminum, that operates as a heat sink. For example only, the substrate 412 and the dielectric may be Thermal Clad® from the Bergquist Company.

Two or more contact pads 420 are electrically connected when the conducting bar 408 is brought into contact with the contact pads 420. In various implementations, a spring may return the conducting bar 408 to a rest position when the solenoid coil 404 is not energized. The spring may either press the conducting bar 408 into contact with the contact pads 420 or draw the conducting bar 408 away from the contact pads 420. The contact pads 420 may be thermally coupled to the substrate 412 to dissipate heat from current passing through the conducting bar 408 and the contact pads 420.

Figure 5A:
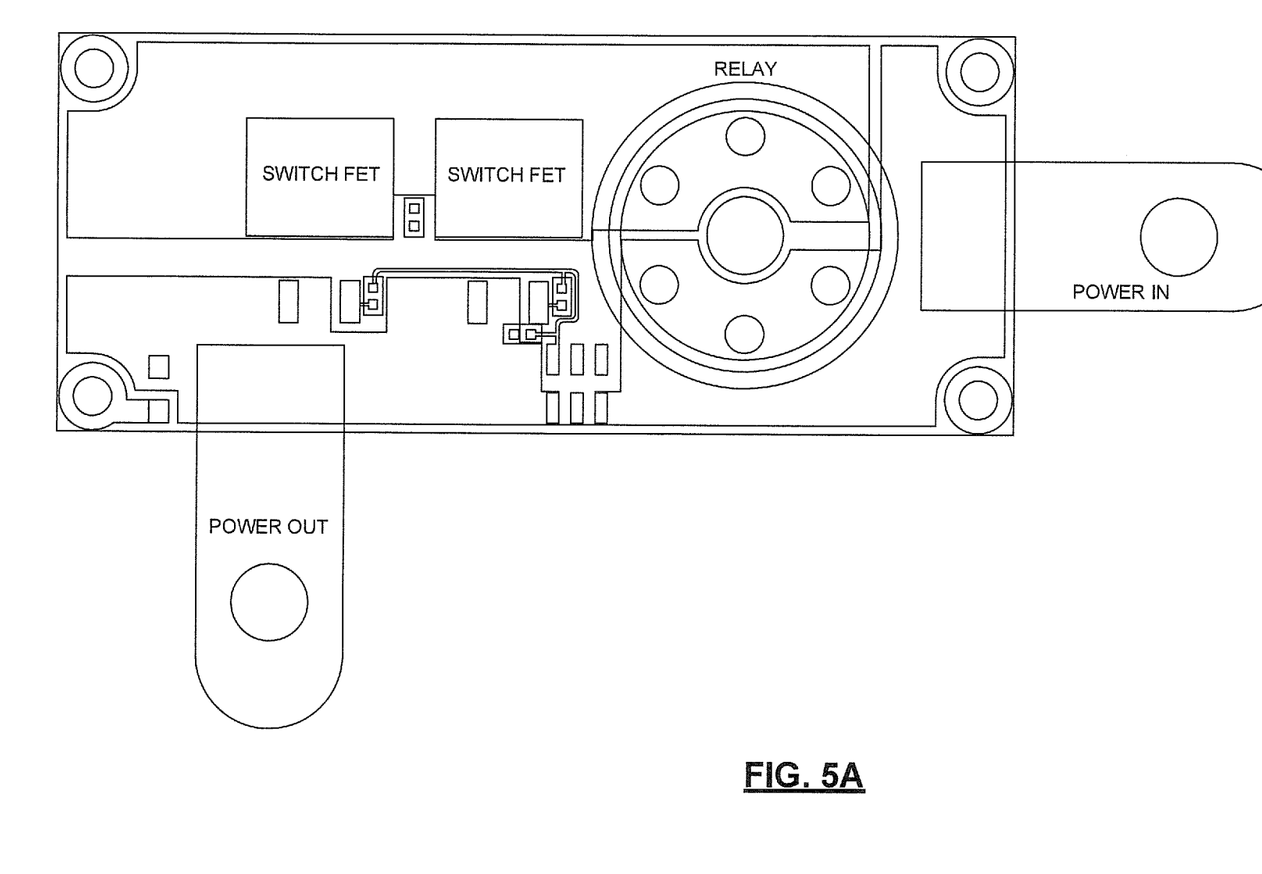
FIGS. 5A-5B are top views of exemplary printed circuit boards for use with the systems of FIGS. 2B and 2D, respectively, according to the principles of the present disclosure.
Figure 5B:
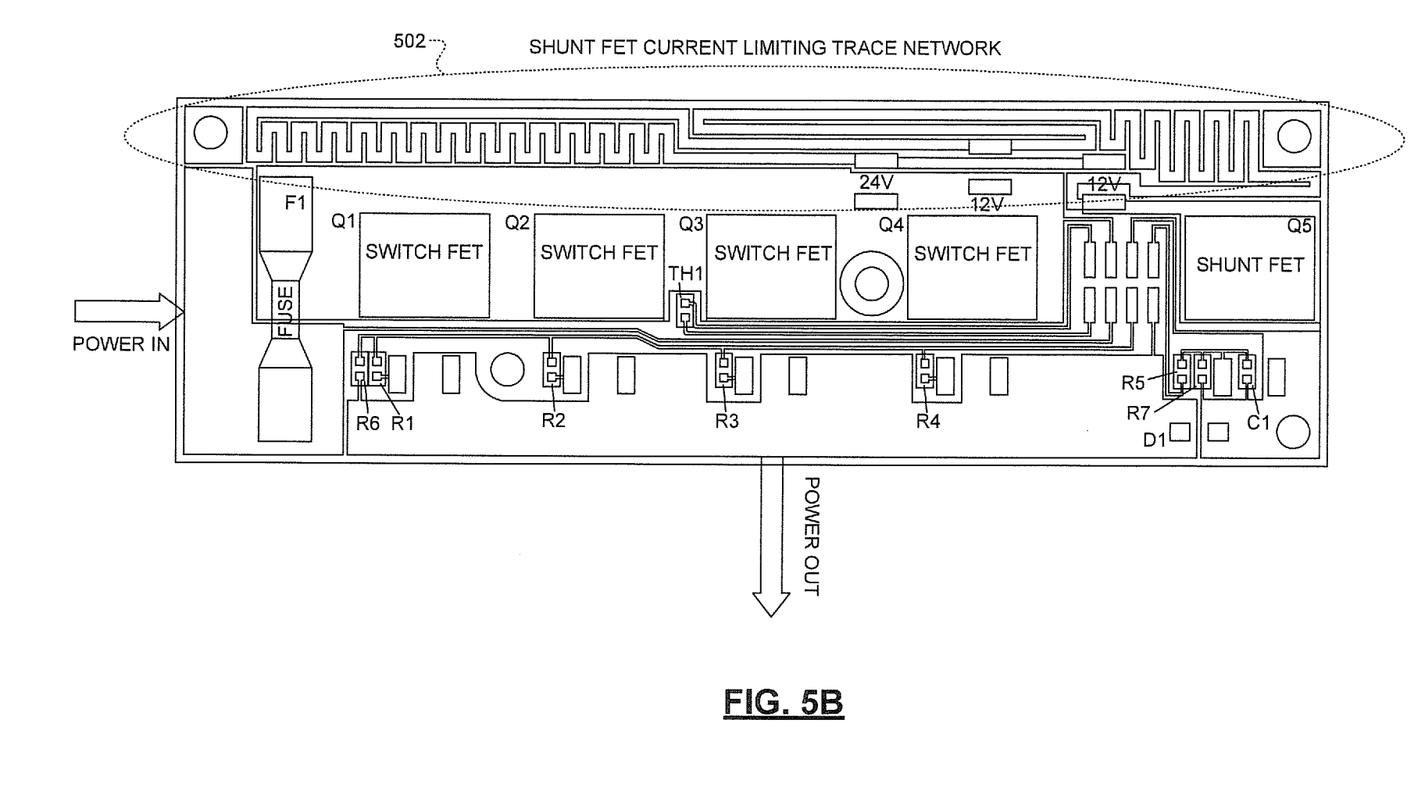

Referring now to FIGS. 5A-5B, top views of exemplary printed circuit boards for use with the systems of FIGS. 2B and 2D, respectively, are presented. In FIG. 5B, a resistive trace 502 may be defined on the printed circuit board to produce a desired resistance for use as the current limiting circuit 264 of FIG. 2D. The length of the resistive trace 502 may determine its resistance.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
    a solid-state switch that is connected in series with a power source and an intake air heater;
    a mechanical current interrupting device that is connected in series with the power source and the solid-state switch; and
    a control module that selectively closes the solid-state switch to provide power to the intake air heater and that causes the mechanical current interrupting device to mechanically interrupt current flow to the intake air heater when a voltage of the intake air heater is outside of a desired range.

2. The control system of claim 1 wherein the mechanical current interrupting device comprises a relay.

3. The control system of claim 2 wherein the control module closes the relay prior to closing the solid-state switch and opens the relay after opening the solid-state switch.

4. The control system of claim 1 wherein the desired range is approximately zero volts when the solid-state switch is open.

5. The control system of claim 1 further comprising a current shunt circuit that is connected in parallel with the intake air heater, wherein the control module closes the current shunt circuit when the voltage of the intake air heater is outside of the desired range.

6. The control system of claim 5 wherein the mechanical current interrupting device comprises at least one of a fuse and a circuit breaker.

7. The control system of claim 5 further comprising a current limiting circuit connected in series with the current shunt circuit.

8. The control system of claim 7 wherein the current limiting circuit comprises a resistive trace on a printed circuit board.

9. The control system of claim 1 further comprising a relay that is connected in parallel with the solid-state switch, wherein the control module selectively closes the relay after closing the solid-state switch, and wherein the control module opens the relay prior to opening the solid-state switch.

10. The control system of claim 9 wherein the control module controls the solid-state switch using pulse-width modulation, and wherein the control module closes the relay after closing the solid-state switch when the pulse-width modulation has a duty cycle of one hundred percent.

11. A control system comprising:
    a solid-state switch that is connected in series with a power source, a mechanical current interrupting device, and an intake air heater;
    a current shunt circuit that is connected in parallel with the intake air heater and that selectively acts as a short circuit; and
    a control module that selectively closes the solid-state switch to provide power to the intake air heater and short circuits the current shunt circuit when a voltage of the intake air heater is outside of a desired range.

12. A system comprising:
    the control system of claim 11; and
    the mechanical current interrupting device, wherein the mechanical current interrupting device comprises at least one of a fuse and a circuit breaker.

13. The control system of claim 11 wherein the desired range is approximately zero volts when the solid-state switch is open.

14. The control system of claim 11 further comprising a current limiting circuit connected in series with the current shunt circuit.

15. The control system of claim 11 wherein the control module selectively closes a relay that is connected in parallel with the solid-state switch after closing the solid-state switch, and wherein the control module opens the relay prior to opening the solid-state switch.

16. The control system of claim 15 wherein the control module controls the solid-state switch using pulse-width modulation, and wherein the control module closes the relay after closing the solid-state switch when the pulse-width modulation has a duty cycle of one hundred percent.

17. A control system comprising:
    a solid-state switch that is connected in series with a power source, an electrically-controlled mechanical current interrupting device, and an intake air heater; and
    a control module that selectively closes the solid-state switch to provide power to the intake air heater and that outputs an electrical signal when a voltage of the intake air heater is outside of a desired range, wherein the electrical signal causes the electrically-controlled mechanical current interrupting device to mechanically interrupt current flow to the intake air heater.

18. A system comprising:
    the control system of claim 17; and
    the electrically-controlled mechanical current interrupting device, wherein the electrically-controlled mechanical current interrupting device comprises a relay.

19. The control system of claim 17 wherein the control module outputs the electrical signal after opening the solid-state switch and stops outputting the electrical signal prior to closing the solid-state switch.

20. The control system of claim 17 wherein the desired range is approximately zero volts when the solid-state switch is open.

21. The control system of claim 17 wherein the control module selectively closes a relay that is connected in parallel with the solid-state switch after closing the solid-state switch, and wherein the control module opens the relay prior to opening the solid-state switch.

22. The control system of claim 21 wherein the control module controls the solid-state switch using pulse-width modulation, and wherein the control module closes the relay after closing the solid-state switch when the pulse-width modulation has a duty cycle of one hundred percent.

* * * * *